US009089989B2

(12) United States Patent
Hörtling

(10) Patent No.: US 9,089,989 B2
(45) Date of Patent: Jul. 28, 2015

(54) GEARED BOLT SYSTEM FOR SECURING A CIRCULAR SAW BLADE

(71) Applicant: Robert Bosch Tool Corporation, Chicago, IL (US)

(72) Inventor: Andreas Hörtling, Schwaigern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/139,984

(22) Filed: Dec. 24, 2013

(65) Prior Publication Data

US 2014/0186137 A1 Jul. 3, 2014

Related U.S. Application Data

(60) Provisional application No. 61/747,449, filed on Dec. 31, 2012.

(51) Int. Cl.
*F16B 35/02* (2006.01)
*B27B 5/32* (2006.01)

(52) U.S. Cl.
CPC .......................................... *B27B 5/32* (2013.01)

(58) Field of Classification Search
USPC .......... 411/366.1, 383, 408, 432, 919; 83/481
See application file for complete search history.

(56) References Cited

U.S. PATENT DOCUMENTS

| | | | | |
|---|---|---|---|---|
| 4,685,848 | A * | 8/1987 | Langer | 411/402 |
| 7,343,841 | B2 * | 3/2008 | Phillips et al. | 83/481 |
| 2003/0223843 | A1 * | 12/2003 | Chen | 411/432 |
| 2014/0186137 | A1 * | 7/2014 | Hortling | 411/366.1 |

* cited by examiner

*Primary Examiner* — Roberta Delisle
(74) *Attorney, Agent, or Firm* — Maginot Moore & Beck LLP

(57) ABSTRACT

A tool-free blade change system includes a sun gear, an arbor bolt including a threaded portion configured to threadedly engage a threaded bore of a power shaft, and a plurality of pins in fixed relationship with the threaded portion, a plurality of planetary gears engaged with the sun gear and located axially outwardly of the sun gear, each of the plurality of planetary gears mounted on a respective one of the plurality of pins, and an outer ring gear engaged with each of the plurality of planetary gears, wherein the sun gear is rotatable with respect to the outer ring gear.

18 Claims, 3 Drawing Sheets

GEARED BOLT SYSTEM FOR SECURING A CIRCULAR SAW BLADE

This application claims the benefit of U.S. Provisional Application No. 61/747,449, filed Dec. 31, 2012, the entire contents of which are herein incorporated by reference.

TECHNICAL FIELD

The disclosure relates generally to power tools, and more particularly to power tools with circular saw blades.

BACKGROUND

A circular saw generally includes a circular blade having a centrally located hole for mounting the blade to a rotatable shaft. The blade is conventionally mounted to an end of the rotatable shaft in compression between an inner flange and outer flange or washer, held by a conventional arbor bolt threaded into a threaded bore in the shaft.

Circular saw blades must be replaced periodically due to blade wear and to accommodate a variety of different cutting uses. In order to install or remove a blade, a wrench typically must be used to supply sufficient torque to remove the bolt from the shaft. Inconveniences are incurred by the use of a conventional bolt to mount a circular saw blade. For example, the task of obtaining an appropriate wrench can be time consuming, and using the wrench can be cumbersome. It is therefore desirable to provide an improved mechanism for securing and replacing a circular saw blade.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to a geared saw blade detachment system. A geared bolt system enables quick and easy removal of a circular saw blade without using a tool. The system includes an inner body, an outer body having a sun gear, a plurality of planet gears, an outer ring gear, an arbor bolt, and a blade washer. The arrangement of the sun gear, the planet gears, and the outer ring gear produces a mechanical advantage between rotation of the outer body and the arbor bolt, amplifying the user applied torque (depending on the gearing ratio). This enhanced torque is required to tighten and loosen the arbor bolt from a circular saw blade safely. Thus, the system enables a user to quickly and easily remove the circular saw blade without the need for an additional tool.

In one embodiment, a tool-free blade change system includes a sun gear, an arbor bolt including a threaded portion configured to threadedly engage a threaded bore of a power shaft, and a plurality of pins in fixed relationship with the threaded portion, a plurality of planetary gears engaged with the sun gear and located axially outwardly of the sun gear, each of the plurality of planetary gears mounted on a respective one of the plurality of pins, and an outer ring gear engaged with each of the plurality of planetary gears, wherein the sun gear is rotatable with respect to the outer ring gear.

In some embodiments, the tool-free blade change system includes an inner body, the inner body in fixed relation with the outer ring gear and including a lower surface configured to transfer a clamping force to a blade washer. In some embodiments, the tool-free blade change system includes a thrust bearing positioned above a flange of the inner body and below a lower surface of a head portion of the arbor bolt. In some embodiments, each of the plurality of pins in a system extends upwardly from an upper surface of the head portion. In some embodiments, the tool-free blade change system includes an outer body including an outer shell extending downwardly from an upper portion, the outer shell extending about the inner body, wherein the sun gear extends downwardly from the upper portion. In some embodiments, the tool-free blade change system includes a sleeve bearing positioned between the outer shell and the inner body. In some embodiments, the sleeve bearing of a tool-free blade change system is positioned beneath a flange portion extending outwardly from the inner body, and above a retaining ring supported by the outer shell. In some embodiments, the tool-free blade change system includes a keyed lower cavity, the keyed lower cavity configured to receive at least a portion of a blade washer in a keyed relationship. In some embodiments, the tool-free blade change system includes a flange positioned between the keyed lower cavity and an upper cavity, and the plurality of planetary gears and the plurality of pins are located within the upper cavity.

In accordance with another embodiment, a method of operating a tool-free blade change system includes rotating a plurality of planetary gears by rotating a centrally positioned sun gear, forcing the rotating plurality of planetary gears to rotate about the sun gear using an outer ring gear located radially outwardly from the plurality of planetary gears and engaged with each of the plurality of planetary gears, and rotating an arbor bolt by rotation of the rotating plurality of planetary gears about the sun gear.

In some embodiments, the method of operating a tool-free blade change system includes transferring a respective rotational force from each of the rotating plurality of planetary gears to a respective one of a plurality of pins, wherein each of the rotating plurality of planetary gears is mounted to the respective one of a plurality of pins and each of the plurality of pins is fixedly connected to the arbor bolt. In some embodiments, the method of operating a tool-free blade change system includes transferring a clamping force from an inner body to a blade washer, the inner body in fixed relation with the outer ring gear. In some embodiments, the method of operating a tool-free blade change system includes transferring the clamping force from a lower surface of a head portion of the arbor bolt through a thrust bearing to a flange of the inner body. In some embodiments, the method of operating a tool-free blade change system includes rotating an outer body including an outer shell extending downwardly from an upper portion, the outer shell extending about the inner body, wherein the sun gear extends downwardly from the upper portion. In some embodiments, the method of operating a tool-free blade change system includes rotating the outer shell about a sleeve bearing positioned between the outer shell and the inner body. In some embodiments, the method of operating a tool-free blade change system includes receiving at least a portion of a blade washer in a keyed relationship with a keyed lower cavity of the inner body prior to rotating the outer shell.

DESCRIPTION

Figure 1:
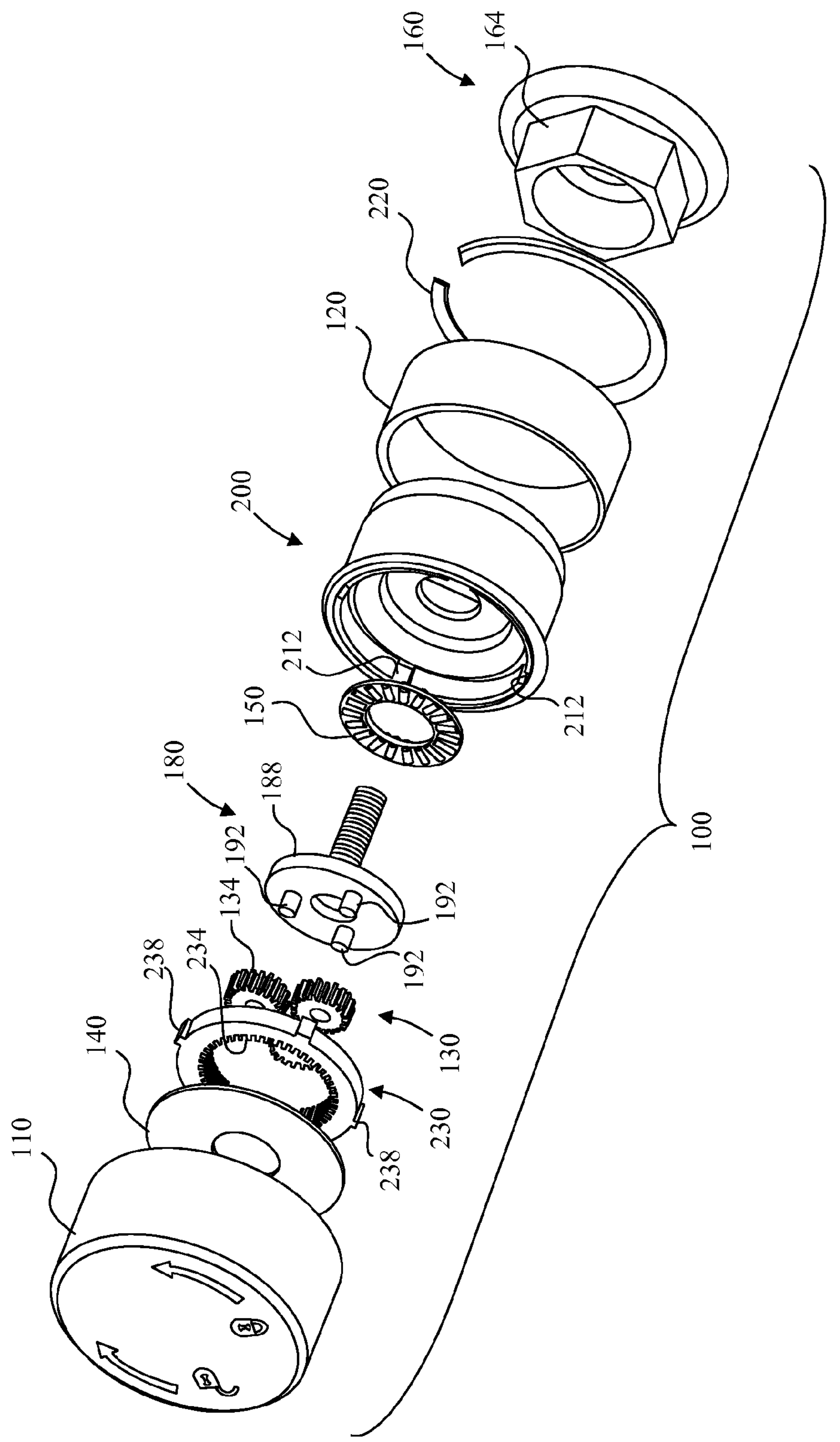
FIG. 1 is an exploded perspective view of a geared bolt system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 illustrates an exploded view of one embodiment of a geared bolt system 100. The geared bolt system 100 includes an outer body 110, a thin plate 140, an outer ring gear 230, three planet gears 130, an arbor bolt 180, a thrust bearing 150, an inner body 200, a sleeve bushing 120, a retaining ring 220, and a blade washer 160. The geared bolt system 100 defines a longitudinal axis 250 (see FIG. 2), which extends through the center of the outer body 110, the inner body 200, and the arbor bolt 180.

Figure 2:
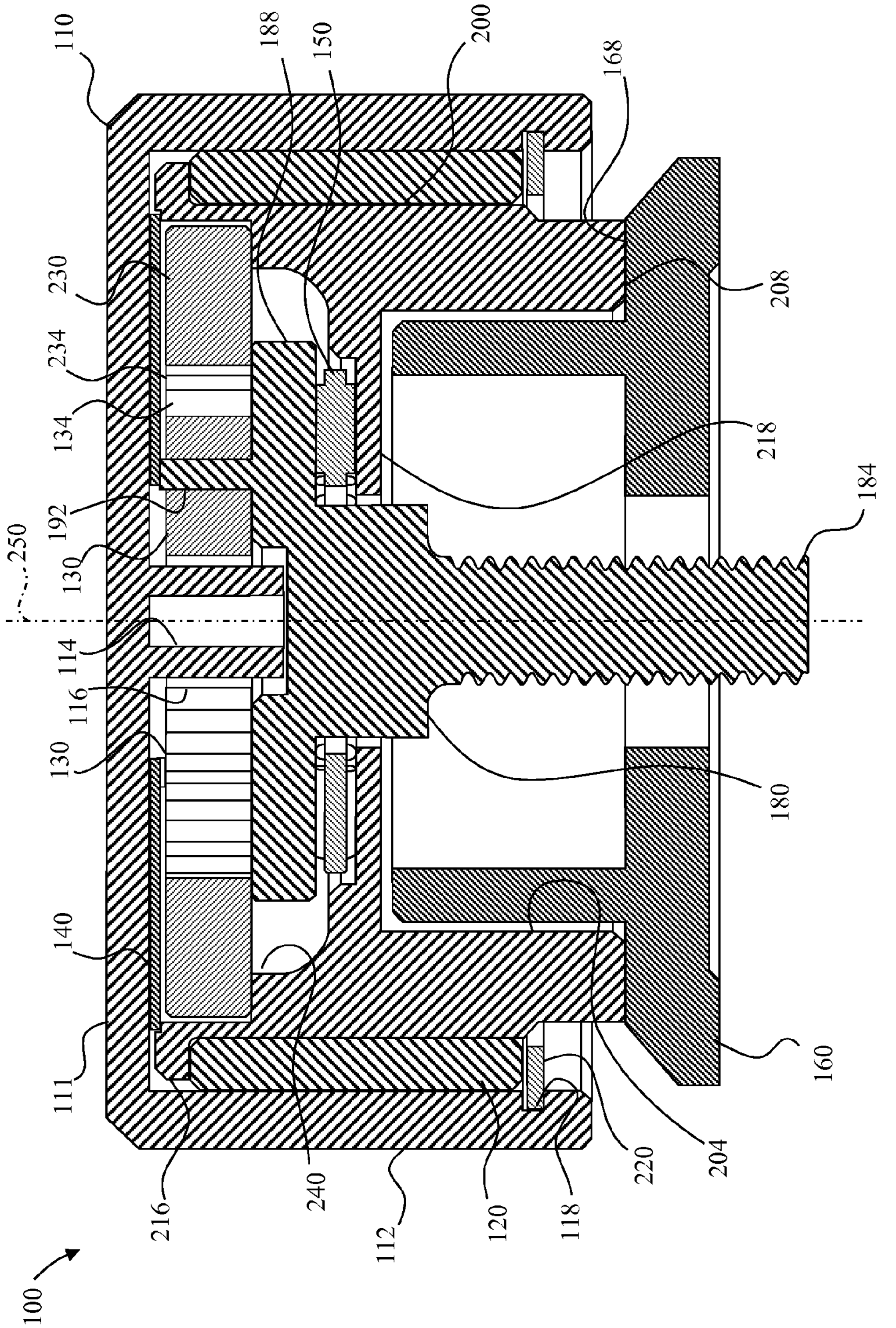
FIG. 2 is a cross-sectional view the geared bolt system of FIG. 1.

As depicted in FIGS. 1 and 2, the outer body 110 includes an outer shell 112, an upper portion 111, and a sun gear 114. The upper portion 111 and the inner body 200 define an upper cavity 240 therebetween. A notch 118 at a lower portion of the inside of the outer shell 112 is configured to receive the retaining ring 220 which holds some of the other components of the geared bolt system 100 within the outer body 110. The sun gear 114 extends from the upper portion 111 into the upper cavity 240, and includes a plurality of teeth (the number of teeth depends on the gearing ratio) 116 extending outwardly from the sun gear 114.

Figure 3:
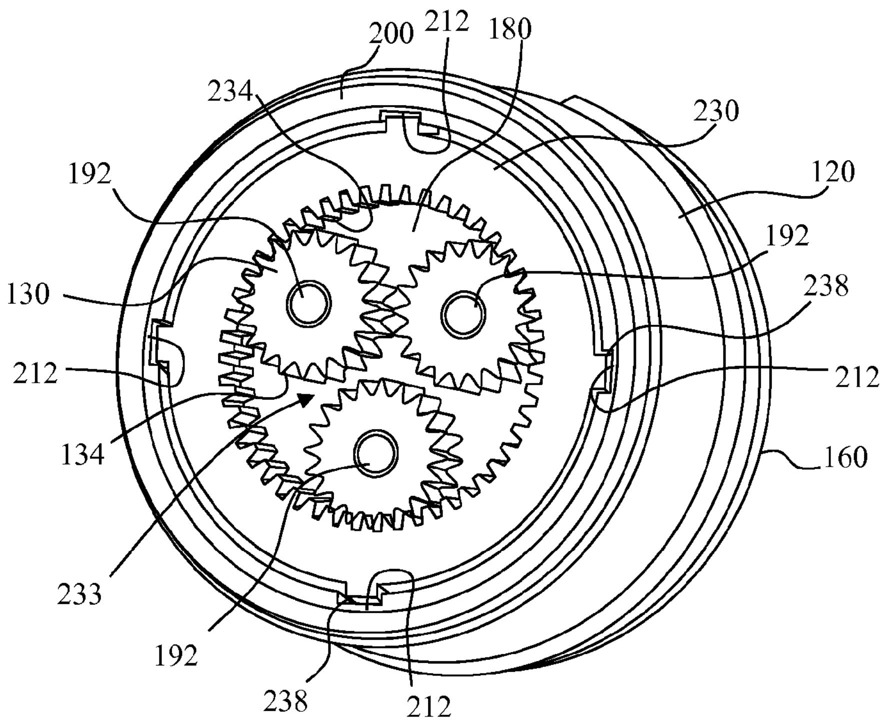
FIG. 3 is a top perspective view of the geared bolt system of FIG. 1 with the outer body removed for clarity.

With reference to FIGS. 2 and 3, the inner body 200 includes four indentations 212, an upper flange 216, and an inner flange 218. The inner body 200 further includes a lower cavity 204, which is hexagonal in the illustrated embodiment, though in other embodiments other suitable shapes can be used. The lower cavity 204 is configured to accommodate a portion of the blade washer 160 and, as described in detail below, to prevent rotation of the inner body 200 with respect to the blade washer 160. The inner body 200 is partially positioned within the outer shell 112 of the outer body 110. The sleeve bushing 120 radially separates the inner body 200 and the outer body 110 and enables the outer body 110 to rotate with respect to the inner body 200. The inner flange 218 extends inwardly toward the axis 250 and separates the upper cavity 240 and the lower cavity 204.

Figure 4:
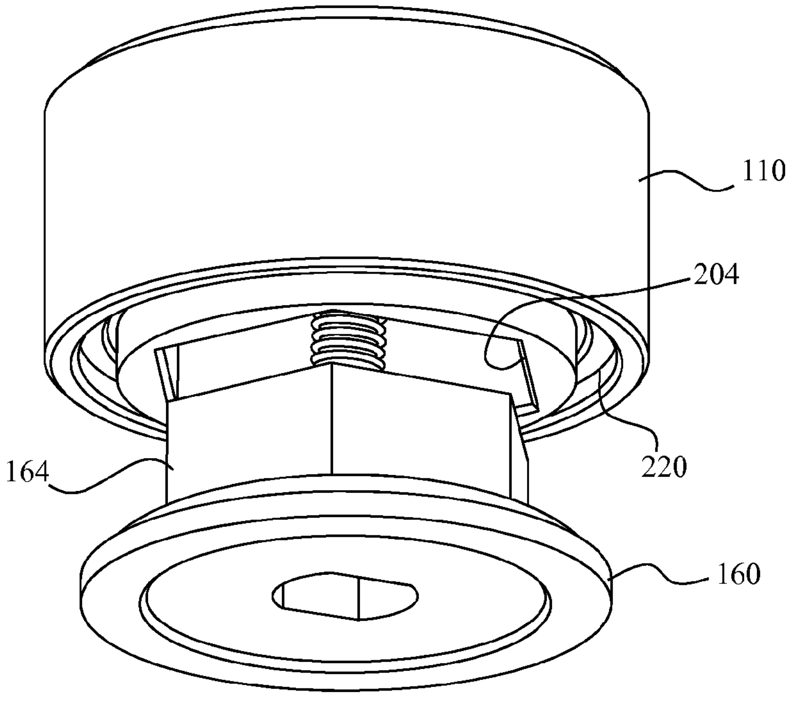
FIG. 4 is a side perspective view of the geared bolt system of FIG. 1 with the blade washer slightly separated from the rest of the assembly.

Referring to FIGS. 1, 2, and 4, the blade washer 160 includes a keyed projection 164 extending in a direction opposite of a circular saw blade or other shaping device (not shown) against which the blade washer 160 is to be pressed. The keyed projection 164 has a shape that corresponds to the shape of the lower cavity 204 of the inner body 200 to enable the lower cavity 204 to receive the keyed projection 164 in a keyed relationship. Accordingly, the surfaces of the keyed projection 164 and the lower cavity 204 engage when the inner body 200 is fitted over the blade washer 160, preventing the inner body 200 and the blade washer 160 from rotating with respect to one another.

With reference to FIGS. 1-3, the arbor bolt 180 includes a head 188, a threaded region 184 extending downwardly away from the head 180, and three pins 192 extending upwardly from the head 188 in a direction opposite the threaded region 184. Each of the three pins 192 extends into an aperture in the center of a respective one of the planet gears 130, enabling each of the planet gears 130 to rotate about the corresponding pin 192 of the arbor bolt 180. The threaded region 184 includes a plurality of threads that extend along axis 250 below the outer blade washer 160 to enable the geared bolt system 100 to mate with a threaded bore (not shown) in a rotatable shaft (not shown). In the illustrated embodiment, the threads are arranged in a left-hand thread, by which is meant the bolt 180 is threaded into a threaded bore by turning the bolt 180 counter-clockwise and removed by turning the bolt 180 in a clockwise direction. The reader should appreciate, however, that the system described herein can be applied to a bolt having a right-hand thread as well.

As shown in FIG. 3, the outer ring gear 230 is substantially annular, and includes a plurality of teeth (the number of teeth depends on the gearing ratio) 234 that extend inwardly toward the axis 250 and four projections 238 extending outwardly from the annular ring away from axis 250. The projections 238 are configured to rest within the indentations 212 of the inner body 200, preventing the outer ring gear 230 from rotating with respect to the inner body 200.

The planet gears 130 each include a plurality of teeth (the number of teeth depends on the gearing ratio) 134 around an outside surface of the gears 130. The teeth 134 of the planet gears 130 are configured to engage the teeth 234 of the outer ring gear 230 and the teeth 116 of the sun gear 114. Specifically, the outer diameter of the planet gears 130 and the inner diameter of the outer ring gear 230 are sized, and the pins 192 are positioned, such that when the planet gears 130 are mounted on the pins 192, the teeth 134 engage the teeth 234 of the outer ring gear 230 at the outermost portions of the planetary gears 130. Additionally, the innermost portions of the planetary gears 130 define a space 233 into which the sun gear 114 is inserted with the teeth 116 of the sun gear 114 engaging the innermost teeth 134 of each of the planetary gears 130.

As can be seen from FIG. 2, the upper cavity 240 is located between the upper portion 111 of the outer body 110 and the upper surfaces of the inner body 200. The upper cavity 240 is configured to accommodate the thin plate 140, the planet gears 130, the outer ring gear 230, the head 188 of the arbor bolt 180, the thrust bearing 150, and the sun gear 114.

The thrust bearing 150 is positioned in the upper cavity 240 between the head 188 of the arbor bolt 180 and the inner body 200, and is configured to enable the arbor bolt 180 to rotate with respect to the inner body 200 with reduced friction while the thrust bearing 150 remains in axial contact with both the arbor bolt 180 and the inner body 200.

The outer ring gear 230 and the planet gears 130 are situated within the upper cavity 240 between an upper surface of the arbor bolt head 188 and the thin plate 140, but are not compressed between the thin plate 140 and the arbor bolt 180 to enable rotation between main body 110, the planet gears 130, and the outer ring gear 230. In the embodiment of FIG. 2, the pins 192 have a height that is greater than the thickness of the planetary rings 130. Accordingly, the thin plate 140 contacts the pins 192 but not the planetary gears 130. In other embodiments the position of the thin plate 140 is controlled only by the use the of the notch on the inner portion of the upper surface of the upper flange 216 (see FIG. 2).

The retaining ring 220 is fitted into the groove 118 in the outer body 110 and axially supports the sleeve bushing 120. The upper flange 216 rests on the sleeve bushing 120 and supports the thin plate 140. Physical interaction of the groove

118, the retaining ring 220, the sleeve bushing 120, the upper flange 216, the thin plate 140, and the upper portion 111 of the outer body 110 retains the inner body 200 and the components within the upper cavity 240 in a substantially constant axial position relative to the outer body 110, even when the system 100 is not attached to a tool.

To attach the geared bolt assembly 100 to a shaping tool, a user aligns the lower cavity 204 of the inner body 200 with the keyed projection 164 of the blade washer 160. The threaded portion 184 of the arbor bolt 180 is then inserted through the blade washer 160, a central opening in a shaping device such as a circular saw blade, and into a threaded bore of a power shaft of the power tool.

The user then rotates the outer body 110 in a counter-clockwise direction, which turns the sun gear 114 that is fixedly attached inside the outer body 110 about the axis 250. As the sun gear 114 turns, the engagement of the teeth 116 of the sun gear 114 with the teeth 134 of the planet gears 130 rotates each of the planet gears 130 about their respective axes defined by the pins 192. Rotation of the planet gears 130 about the pins 192 forces rotation of the pins 192 about the axis 250.

Specifically, engagement of the keyed protrusion 164 of the blade washer 160 and the surfaces of the lower cavity 204 of the inner body 200 prevent rotation of the inner body 200 with respect to the blade washer 160. Likewise, the interlocking of the protrusions 238 of the outer ring gear 230 with the indentations 212 of the inner body 200 prevent the outer ring gear 230 from rotating with respect to the inner body 200 or the blade washer 160. Consequently, because the teeth 134 of the planet gears 130 are engaged with the teeth 234 of the outer ring gear 230, and because the outer ring gear 230 cannot rotate due to the tabs 238 in the indentations 212, the planetary gears 130 are forced against the pins 192. The pins 192 are fixedly connected to the head 188. Therefore, the force applied to the pins 192 is transferred to the head 188 and the threaded portion 184 is threaded into the threaded bore (not shown) as the head 188 rotates.

The configuration of the geared bolt system provides a torque advantage as the threaded portion 184 is threaded into or out of a threaded bore. The sun gear 114 is positioned within the outer ring gear 230 and, therefore, has a smaller radius than the outer ring gear 230. Likewise, the radius defined by the rotating pins 192 is larger than the diameter of the sun gear 114. As the sun gear 114 turns the planet gears 130, the teeth 134 of the planet gears 130 move within teeth 234 of the outer ring gear 230 at the same velocity at which the teeth 116 of the sun gear 114 rotate. Because the radius of the outer ring gear 230 is greater than the radius of the sun gear 114, the angular velocity of the teeth 134 of the planet gears 130 engaging the outer ring gear 230 is lower than the angular velocity of the sun gear and a greater torque is generated at the outer ring gear 230. This increased torque is transferred to the pins 192 by movement of the planet gears 130 in the circular path about the axis 250, producing a mechanical advantage between rotation of the outer body 110 and the arbor bolt 180.

The rotation of the arbor bolt 180 thus forces the threads in the threaded region 184 to engage the threaded bore. As the arbor bolt 180 further rotates, the threads force the bolt downwardly along axis 250. The lower surface of head 188 presses axially into the thrust bearing 150, which presses downwardly against the flange 218. The lower surface 208 of the inner body 200 is thus forced against the upper surface 168 of the blade washer 160 which clamps the saw blade.

As the arbor bolt 180 rotates, the geared bolt system 100 provides a torque advantage as noted above. Specifically, the relatively high rotational speed of the sun gear 114 is transferred into a slower rotation of the pins 192 with increased torque. The ratio of the gearing between the sun gear 114, the planetary gears 130 and the outer ring gear 230 thus multiplies the user applied torque in order to get an enhanced torque for the arbor bolt.

Further rotation of the outer body, supplemented by the mechanical advantage of the gearing system, compresses the blade washer 160 and blade against the power shaft or an inner washer (not shown) to force the saw blade to rotate with rotation of the power shaft.

To remove the saw blade, the user rotates the outer body 110 in the clockwise direction. Rotating the outer body 110 turns the sun gear 114, which rotates the planet gears 130 and turns the arbor bolt 180 in the clockwise direction. The mechanical advantage produced by the gearing system reduces the torque required to loosen the arbor bolt 180 from the blade washer 160 and the threaded bore, enabling the arbor bolt 180 to be removed by the user hand-turning the outer body 110. As the user continues to rotate the outer body 110 clockwise, the threaded region 184 of the arbor bolt 180 disengages from the blade washer 160 so that the blade can be removed from the circular saw.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A tool-free blade change system, comprising:

a sun gear;

an arbor bolt including a threaded portion configured to threadedly engage a threaded bore of a power shaft, and a plurality of pins in fixed relationship with the threaded portion;

a plurality of planetary gears engaged with the sun gear and located axially outwardly of the sun gear, each of the plurality of planetary gears mounted on a respective one of the plurality of pins;

an outer ring gear engaged with each of the plurality of planetary gears, wherein the sun gear is rotatable with respect to the outer ring gear; and an inner body, the inner body in fixed relation with the outer ring gear and including a lower surface configured to transfer a clamping force to a blade washer.

2. The system of claim 1, further comprising:

a thrust bearing positioned above a flange of the inner body and below a lower surface of a head portion of the arbor bolt.

3. The system of claim 2, wherein each of the plurality of pins extends upwardly from an upper surface of the head portion.

4. The system of claim 2, further comprising:

an outer body including an outer shell extending downwardly from an upper portion, the outer shell extending about the inner body, wherein the sun gear extends downwardly from the upper portion.

5. The system of claim 4 further comprising:

a sleeve bearing positioned between the outer shell and the inner body.

6. The system of claim 5, wherein the sleeve bearing is positioned beneath a flange portion extending outwardly from the inner body, and above a retaining ring supported by the outer shell.

7. The system of claim 6, wherein the inner body further comprises:

a keyed lower cavity, the keyed lower cavity configured to receive at least a portion of the blade washer in a keyed relationship.

8. The system of claim 7, wherein:

the flange is positioned between the keyed lower cavity and an upper cavity; and the plurality of planetary gears and the plurality of pins are located within the upper cavity.

9. The system of claim 1, further comprising:

an outer body including an outer shell extending downwardly from an upper portion, the outer shell extending about the inner body, wherein the sun gear extends downwardly from the upper portion; and a thin plate positioned between the upper portion and the plurality of pins.

10. The system of claim 9, wherein:

the plurality of pins have a first height;

the plurality of planetary gears have a second height; and the first height is greater than the second height such that the thin plate can contact the plurality of pins and cannot contact the plurality of planetary gears.

11. A method of operating a tool-free blade change system, comprising:

rotating a plurality of planetary gears by rotating a centrally positioned sun gear;

forcing the rotating plurality of planetary gears to rotate about the sun gear using an outer ring gear located radially outwardly from the plurality of planetary gears and engaged with each of the plurality of planetary gears;

rotating an arbor bolt by transferring a respective rotational force from each of the rotating plurality of planetary gears to a respective one of a plurality of pins, wherein each of the rotating plurality of planetary gears is mounted to the respective one of the plurality of pins and each of the plurality of pins is fixedly connected to the arbor bolt;

forcing the arbor bolt against an inner body by rotating the arbor bolt; and transferring a clamping force from the inner body to a blade washer, the inner body in fixed relation with the outer ring gear.

12. The method of claim 11, further comprising:

transferring the clamping force from a lower surface of a head portion of the arbor bolt through a thrust bearing to a flange of the inner body.

13. The method of claim 12, wherein rotating the plurality of planetary gears by rotating the centrally positioned sun gear comprises:

rotating an outer body including an outer shell extending downwardly from an upper portion, the outer shell extending about the inner body, wherein the sun gear extends downwardly from the upper portion.

14. The method of claim 13 wherein rotating the outer body comprises:

rotating the outer shell about a sleeve bearing positioned between the outer shell and the inner body.

15. The method of claim 14, further comprising:

receiving at least a portion of a blade washer in a keyed relationship with a keyed lower cavity of the inner body prior to rotating the outer shell.

16. The method of claim 11, wherein rotating the plurality of planetary gears comprises;

rotating an outer body including an outer shell extending downwardly from an upper portion, the outer shell extending about the inner body, wherein the sun gear extends downwardly from the upper portion.

17. The method of claim 16, further comprising;

separating the plurality of pins from the upper portion by a thin plate movable with respect to both the plurality of pins and the upper portion.

18. The method of claim 17, wherein:

the plurality of pins have a first height;

the plurality of planetary gears have a second height; and the first height is greater than the second height such that the thin plate can contact the plurality of pins and cannot contact the plurality of planetary gears.

* * * * *